United States Patent [19]
Bartlett et al.

[11] Patent Number: 5,093,377
[45] Date of Patent: Mar. 3, 1992

[54] BLOWING AGENT AND PROCESS FOR PREPARING POLYURETHANE FOAM

[75] Inventors: Philip L. Bartlett; Joseph A. Creazzo, both of Wilmington, Del.

[73] Assignee: E. I. du Pont de Nemours and Company, Wilmington, Del.

[21] Appl. No.: 747,019

[22] Filed: Aug. 19, 1991

[51] Int. Cl.$^5$ .............................................. C08J 9/14
[52] U.S. Cl. ...................................... 521/114; 521/98; 521/131; 521/910
[58] Field of Search ................... 521/131, 98, 910, 114

[56] References Cited

U.S. PATENT DOCUMENTS

| | | | |
|---|---|---|---|
| 4,303,758 | 12/1981 | Gusmer | 521/117 |
| 4,422,877 | 12/1983 | Spitzer et al. | 521/78 |
| 4,996,240 | 2/1991 | Osipow et al. | 521/68 |
| 5,401,287 | 8/1991 | Drigger et al. | 524/568 |

Primary Examiner—Morton Foelak

[57] ABSTRACT

The use of 1,1-difluoroethane (HFC-152a) and dimethyl ether, optionally with up to 50 mole % of water, as the blowing agent is disclosed as an efficient route to a rigid, closed-cell polyurethane or polyisocyanurate foam of improved cell structure and excellent insulation properties.

5 Claims, No Drawings

BLOWING AGENT AND PROCESS FOR PREPARING POLYURETHANE FOAM

FIELD OF THE INVENTION

This invention relates to compositions for use as blowing agents in the process for manufacturing polyurethane and polyisocyanurate foams. More particularly, it relates to such compositions that are "safe" to use—safe for humans and safe for the environment. Specifically, the compositions of this invention have little or no effect on the ozone layer depletion process; display little or no toxicity to humans; and make no or very little contribution to the global warming process known as the "greenhouse effect". Although these compositions have minimal effect in these areas, they are extremely effective in the process for preparing closed-cell polyurethane foams for the construction industry.

BACKGROUND OF THE INVENTION

Closed-cell polyurethane foams are widely used for insulation purposes in building construction and in the manufacture of energy efficient electrical appliances. In the construction industry, polyisocyanurate board stock is used in roofing and siding for its insulation and load-carrying capabilities. Poured and sprayed polyurethane foams are also used in construction. Sprayed polyurethane foams are widely used for insulating large structures such as storage tanks, etc. Pour-in-place polyurethane foams are used, for example, in appliances such as refrigerators and freezers plus they are used in making refrigerated trucks and rail cars.

All of these various types of polyurethane foams require blowing agents for their manufacture. Insulating foams depend on the use of halocarbon blowing agents, not only to foam the polymer but, more importantly, for their low vapor thermal conductivity. This property, vapor conductivity, contributes significantly to the foam's insulation value. Historically, these polyurethane foams have been made using trichlorofluoromethane (CFC-11) as the primary blowing agent.

A second important type of insulating foam is the phenolic foam. This foam, which displays very attractive non-flammability characteristics, is generally made with CFC-11 and CFC-113 (1,1,2-trichloro-1,2,2-trifluoroethane) blowing agents.

CFC-11, historically the blowing agent of choice in producing polyurethane/polyisocyanurate foams, is being phased out because of its effect on the environment.

In September 1987, the United Nations through its Environment Program (UNEP) issued a proposal calling for a 50 percent reduction in world-wide production of fully halogenated chlorofluorocarbons (CFCs) by 1998. This proposal was ratified Jan. 1, 1989 and became effective July 1, 1989. On Nov. 15, 1990, the U.S. Clean Air Act was amended in such a manner as to provide for a production freeze and use limitation to refrigeration for hydrochlorofluorocarbons (HCFCs), such as HCFC-22, on Jan. 1, 2015. Complete production ban on HCFCs is scheduled for Jan. 1, 2030. This phase-out of HCFCs by 2030 adds incentive to develop a hydrofluorocarbon (HFC) alternative for manufacturing polyurethane/polyisocyanurate foam. There is, therefore, a need for an effective blowing composition for polyurethane foams that contributes little or nothing to the stratosphere ozone depletion process or to the "greenhouse effect".

The blowing agent should also provide a relatively low thermal conductivity to the foam, i.e., provide relatively high insulation values for the foam. There are three primary factors to cause heat to be lost or transferred across or through an insulating foam: (1) conductivity through the foam cell gas, (2) conductivity through the solid polymer and (3) radiational heat loss across the foam cells. The contribution of these factors to total heat loss is about 44 percent, about 22 percent and about 34 percent, respectively. Of these three, the blowing agent contributes significantly only to the thermal conductivity through the foam cell gas.

A fourth factor contributing to the insulation value is the size of the cells formed during the foaming process. The blowing agent should be capable of contributing to the formation of a uniform, closed-cell structure with small, fine cells.

The basis object of these invention is to provide an improved, efficient process for producing polyurethane and polyisocyanurate foams employing an effective blowing agent that has substantially no ozone depletion potential (ODP), has no or very low global warming potential (GWP), i.e., makes no significant contribution to the "greenhouse effect", and provides foams that display relatively high insulation values.

PRIOR ART

It is well known to prepare polyurethane foams by reacting an organic polyisocyanate (including diisocyanates) with an active hydrogen-containing compound in the presence of a blowing agent or agents. Generally speaking, such blowing agents are volatile organic compounds which are liquid at room temperature. Such blowing agents are generally inert compounds that do not decompose or react during the polymerization reaction. The polymerization reaction is exothermic. The reaction exotherm is sufficient to vaporize the blowing agent, which then becomes encapsulated in the liquid phase of the polymerizing reaction mixture resulting in the formation of cells. The formation of cells causes the reaction mixture to expand and form a foam which subsequently cures to become a rigid closed-cell polyurethane foam.

Alternatively, it is also well known to prepare foams with a combination of a liquid blowing agent and small amounts of a blowing agent precursor. A blowing agent precursor is a substance which reacts chemically with the polymerizing reaction mixture, or decomposes thermally as a result of exposure to, for example, the reaction exotherm, generating "in situ" a gas. The generated gas functions as additional blowing in preparing the foam. A commonly used blowing agent precursor is water, which when reaction with isocyanate provides gaseous carbon dioxide.

In U.S. Pat. No. 4,943,597, a process is disclosed wherein significant quantities of water in a formulation in combination with a liquid blowing agent is employed to prepare foam. Although the patent states that the resulting foams have acceptable properties, significant improvements would be desirable. It has been found that this use of a significant amount of water in the foaming process causes several problems:

1. when making appliance foams, i.e., at isocyanate indexes of about 1.0, the foam reactants flow poorly;

2. it is difficult to control the reaction exotherm which can lead to thermal degradation of the polymer;
3. the resulting foam tends to be friable;
4. poor facer adhesion is obtained and the foam tends to be dimensionally unstable;
5. relatively poor insulation characteristics are obtained; and
6. larger amounts of costly isocyanate must be used.

In U.S. Pat. No. 4,972,003, the use of a gaseous blowing agent in conjunction with about 25-95 mole percent, based on total moles of blowing agent, of water is disclosed for the preparation of a rigid closed-cell polyisocyanate-based foam. The preferred halocarbons for use in this invention are the chlorofluorocarbons of methane, ethane and propane; the bromofluorocarbons of methane, ethane and propane; and the fluorocarbons of ethane and propane; or mixtures thereof. Especially preferred are the chlorofluoroethane and fluoroethane halocarbons due to their commercial availability and suitability for preparing polyisocyanate-based foam. Specifically disclosed are the chlorofluoroethanes including chloropentafluoroethane (CFC-115), chlorotetrafluoroethane (HCFC-124 or isomer HCFC-124a); the fluoroethanes including tetrafluoroethane (HFC-134 or isomer HFC-134a), trifluoroethane (HFC-143a), difluoroethane (HFC-152a) and fluoroethane (HFC-161). However, only operating examples using chlorodifluoroethane (HCFC-142b) and over 25 mole percent water as the blowing agent composition in each example are compared to using the chlorofluoromethane (CFC-11) and water as the blowing agent composition in the controls are disclosed in this patent.

U.S. Pat. No. 4,997,706 discloses the use of a $C_{2-6}$ polyfluorocarbon compound (containing no chlorine or bromine) in the blowing agent for the preparation of rigid, closed-cell polymer foams. Although disclosing the difluoro-, trifluoro, tetrafluoro- and pentafluoroethanes, the only blowing agent within this "no chlorine or bromine" group of compounds that is exemplified is 1,1,1,2-tetrafluoroethane (HFC-134a) in conjunction with about 50 mole percent carbon dioxide in Example 1 and 78 mole percent carbon dioxide in Example 2 (carbon dioxide resulting from the reaction of the isocyanate with water in the blowing agent), i.e., HFC-134a and water as the blowing agent composition, for producing a closed-cell polyurethane or polyisocyanurate foams. The results of using the HFC-134a and water composition are compared to the results of using trichlorofluoromethane (CFC-11), chlorodifluoroethane (HCFC-142b), and chlorodifluoromethane (HCFC-22), each with water, as the blowing agent compositions.

It is an object of this invention to provide an improved process for preparing rigid, closed-cell polyisocyanate-based foams by using a novel blowing agent composition.

SUMMARY OF THE INVENTION

I have discovered that the use of a mixture of 1,1-difluoroethane (HFC-152a) and 5-75 weight percent of dimethyl ether (DME) as the blowing agent, in the absence or in the presence of up to 50 mole percent water, will provide a process that is relatively rapid and efficient in producing a rigid, closed-cell polyurethane or polyisocyanurate foam displaying excellent thermal insulation and improved dimensional stability. The resulting polyisocyanurate may have an isocyanate index (ratio of equivalents of isocyanates to equivalents of active hydrogen-containing groups) advantageously from about 0.9 to about 10.0, preferably about 1.0 to about 4.0.

Although mixtures of HFC-152a with 5-75 weight percent DME may be used in the blowing agents for the process of this invention, the preferred mixtures contain 5-30 weight percent DME. It is known that HFC-152a and DME are an azeotropic mixture at 70° F. and 64.5 psig. containing 68 weight percent DME. However, the presence of this amount of DME tends to produce a soft foam and would require a polyol having a lower equivalent weight (greater functionality) to produce a more rigid foam.

As stated above, operation of the process in the substantial absence of water with no substantial release of carbon dioxide for foaming is preferred for obtaining the most desirable results of this invention. However, the presence of water (less than 10 mole percent of polyol) due to the incidental water accompanying the hygroscopic polyols used in producing the polyurethane foams, may be unavoidable, and is not considered to contribute any significant amount of carbon dioxide to the foaming process.

Polyisocyanate-based foams are prepared by reacting at least one organic polyisocyanate with at least one active hydrogen-containing compound in the presence of the blowing agent composition described hereinabove.

The quantity of blowing agent composition employed when preparing a foam is sufficient to give a desired density to the foam. Advantageously, sufficient blowing agent is employed to provide a polyurethane foam having an overall density of from about 10 to about 500, preferably from about 18 to about 100 kg/m$^3$ (1 kg/m$^3$=0.062 lb/ft$^3$).

It is often convenient to preblend the blowing agent composition with the active hydrogen-containing compound before contacting the resulting blend with the polyisocyanate. It is also possible to simultaneously blend together the polyisocyanate, active hydrogen-containing compound and blowing agent composition in one operation resulting in the production of polyisocyanate-based foam. Preferably the blowing agent composition is blended with the active hydrogen-containing compound before contacting with the polyisocyanate.

An isocyanate reactive composition can be prepared by blending at least one active hydrogen-containing compound with the blowing agent composition. Advantageously, the blend contains at least 5 and up to 50, preferably up to 25 weight percent of the blowing agent composition, based on the total weight of active hydrogen-containing compound and blowing agent composition.

The active hydrogen-containing compound(s) used in preparing the isocyanate-reactive composition may have an equivalent weight of about 50 to 700, preferably about 90 to about 270.

Polyisocyanates useful in the process of this invention for making polyisocyanate-based foam include aromatic, aliphatic and cycloaliphatic polyisocyanates and combinations thereof. Representative of these types are diisocyanates such as m- or p-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate (and isomers), naphthylene-1,5-diisocyanate, 2-methylphenyl-2,4-phenyldiisocyanate, diphenylmethane-4,4'diisocyanate, diphenylmethane-2,4'-diisocyanate, 4,4'-biphenylenediisocyanate, 3,3'-diisocyanate, 4,4'biphenylenediisocyanate and 3,3'-dimethyldiphenylpropane-4,4-diisocyanate; triisocyanates such as toluene-2,4,6-triisocyanate and polyisocyanates such as 4,4'-dimethyldiphenylmethane-2,2',5',5'-tetraisocyanate and the diverse polymethylenepolyphenyl polyisocyanates.

A crude polyisocyanate may also be used in the practice of this invention, such as the crude toluene diisocyanate obtained by the phosgenation of a mixture of toluene diamines or the crude diphenylmethane diisocyanate obtained by the phosgenation of crude diphenylmethanediamine.

Preferred are methylene-bridged polyphenyl-polyisocyanates, due to their ability to crosslink the polyurethane.

Active hydrogen-containing compounds which are useful in this present invention include those materials having two or more groups which contain an active hydrogen atom which reacts with an isocyanate. Preferred among such compounds are materials having at least two hydroxyl, primary or secondary amine, carboxylic acid, or thiol groups per molecule. Polyols, i.e., compounds having at least two hydroxyl groups per molecule, are especially preferred due to their desirable reactivity with polyisocyanates.

Suitable isocyanate reactive materials for preparing rigid polyisocyanate-based foams include those having an equivalent weight of about 50 to about 700, preferably about 90 to 270. Such isocyanate-reactive materials also advantageously have a functionality of at least 2, preferably about 3 up to about 16 active hydrogen atoms per molecule.

Suitable additional isocyanate-reactive materials include polyether polyols, polyester polyols, polyhydroxy-terminated acetal resins, hydroxyl-terminated amines and polyamines, and the like. Most preferred for preparing rigid foams is a polyol prepared by adding an alkylene oxide to an initiator having from about 2 to about 8, preferably about 3 to about 8, active hydrogen atoms.

Other polyols include alkylene oxide derivatives of Mannich condensates, and aminoalkyl-piperazine-initiated polyethers as describes in U.S. Pat. Nos. 4,704,410 and 4,704,411. The low hydroxyl number, high equivalent weight alkylene oxide adducts of carbohydrate initiators such as sucrose and sorbitol may also be used.

In addition to the foregoing critical components, it is often desirable to employ certain other ingredients in preparing polyisocyanate-based foams. Among these additional ingredients are catalysts, surfactants, flame retardants, reinforcing agents, fillers, antistatic agents and the like.

When preparing a polyisocyanate-based foam by the process of this invention it is generally preferred to employ a minor amount of surfactant to stabilize the foaming reaction mixture until it cures. Such surfactants may comprise a liquid or solid organosilicone compound. Other, less preferred surfactants include polyethylene glycol ethers of long chain alcohols, tertiary amine or alkanolamine salts of long chain alkyl acid sulfate esters, alkyl sulfonic esters and alkyl arylsulfonic acids. The surfactants are employed in amounts sufficient to stabilize the foaming reaction mixture against collapse and to prevent the formation of large, uneven cells. About 0.2 to about 5 parts or even more of the surfactant per 100 parts by weight polyol are usually sufficient.

One or more catalysts for the reaction of the polyol with the polyisocyanate may also be used. Any suitable urethane catalyst may be used, including tertiary amine compounds and organometallic compounds. Exemplary tertiary amine compounds include dimethyl cyclohexylamine, triethylenediamine, n-methyl morpholine, pentamethyldiethylenetetramine, tetramethylethylenediamine, 1-methyl-4-dimethylaminoethylpiperazine, 3-methoxy-N-dimethylpropylamine, N-ethyl morpholine, diethylethanolamine, N-coco morpholine, N,N-dimethyl-N',N'-dimethylisopropylpropylenediamine, N,N-diethyl-3-diethylaminopropylamine, dimethylbenzylamine, tris(dimethylaminomethyl)phenyl and the like. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-2-ethyl hexanoate, as well as other organometallic compounds. A catalyst for the trimerization of polyisocyanates, such as an alkali metal alkoxide, alkali metal carboxylate, or quaternary ammonium compound, may also optionally be employed herein. Such catalysts are used in an amount which measurably increases the rate of reaction of the polyisocyanate. Typical amounts are about 0.1 to about 5 parts of catalyst per 100 parts by weight of polyol.

In the process of making a polyisocyanate-based foam, the polyol(s), polyisocyanate and other components are contacted, thoroughly mixed and permitted to expand and cure into a cellular polymer. The particular mixing apparatus is not critical, and various types of mixing head and spray apparatus are conveniently used. It is often convenient, but not necessary, to preblend certain of the raw materials prior to reacting the polyisocyanate and active hydrogen-containing components. For example, it is often useful to blend the polyol(s), blowing agent, surfactant(s), catalyst(s) and other components except for polyisocyanates, and then contact this mixture with the polyisocyanate. Alternatively, all the components may be introduced individually to the mixing zone where the polyisocyanate and polyol(s) are contacted. It is also possible to pre-react all or a portion of the polyol(s) with the polyisocyanate to form a prepolymer.

In one aspect, this invention is a rigid, closed-cell polyisocyanate-based foam. It is prepared by contacting an organic polyisocyanate with an active hydrogen-containing compound in the presence of the HFC-152a/DME blowing agent composition characterized in that the so-prepared foam contains within its cells gaseous HFC-152a along with DME (and $CO_2$, if water has been used).

The rigid, closed-cell polymer foams of this invention are useful in spray insulation as foam-in-place appliance foams, or rigid insulating board stock and in laminates.

EXAMPLES

The following examples are given to illustrate the invention and should not be interpreted as limiting it in any way. Unless stated otherwise, all parts and percentages are given by weight.

Properties of the foams are determined on samples taken from a $2'' \times 14'' \times 15''$ mold and having the stated molded density.

The thermal insulation value, K-factor, is measured with the Rapid-K Heat Flow Meter Instrument manufactured by Holometrix, Inc. The instrument measures K-factor in accordance with ASTM C518 using cold and hot plate temperatures. The foam samples used to determine the aged K-factor are stored at ambient temperature, pressure and humidity conditions. Lower values of K-factor indicate better thermal insulative properties.

The physical properties of the various blowing agents used in the following examples are summarized:

| Blowing Agent | Approx. Normal Boiling Point °C. @ 760 mm/HG | Gas Thermal Conductivity* | Relative Ozone Depletion Potential** |
|---|---|---|---|
| HFC-152a/DME*** | −26 | 9.65 | 0.0 |
| HFC-152a: $C_2H_4F_2$ | −25 | 8.49 | 0.0 |
| CFC-11: $CCl_3F$ | +24 | 4.51 | 1.0 |

*BTU-ft/hr-ft². °F. × 10³ @ 25° C.
**Potentials are relative to CFC-11
***Blends containing 5-75 weight percent DME The ozone depletion potential (ODP) of the fluoroethane and the blends thereof, compared to various controls, was calculated using the method described in "The Relative Efficiency of a Number of Halocarbon for Destroying Stratospheric Ozone", D. J. Wuebles, Lawrence Livermore Laboratory report UCID-18924 (January 1981) and "Chlorocarbon Emission Scenarios: Potential Impact on Stratospheric Ozone", D. J. Wuebles, Journal Geophysics Research, 88, 1433–1443 (1983).

Basically, the ODP is the ratio of the calculated ozone depletion in the stratosphere resulting from the emission of a particular agent compared to the ODP resulting from the same rate of emission of CFC-11 which is set at 1.0. Ozone depletion is believed to be due to the migration of compounds containing chlorine or bromine through the troposphere into the stratosphere where these compounds are photolyzed by UV radiation into chlorine or bromine atoms. These atoms will destroy the ozone ($O_3$) molecules in a cyclical reaction where molecular oxygen ($O_2$) and [ClO] or [BrO] radicals are formed, those radicals reacting with oxygen atoms formed by UV radiation of $O_2$ to reform chlorine or bromine atoms and oxygen molecules, and the reformed chlorine or bromine atoms then destroying additional ozone, etc., until the radicals are finally scavenged from the stratosphere. It is estimated that one chlorine atom will destroy 10,000 ozone molecules and one bromine atoms will destroy 100,000 ozone molecules.

The ozone depletion potential is also discussed in "Ultraviolet Absorption Cross-Sections of Several Brominated Methanes and Ethanes", L. T. Molina, M. J. Molina and F. S. Rowland, J. Phys. Chem, 86, 2672–2676 (1982); in Bivens et al., U.S. Pat. No. 4,810,403; and in "Scientific Assessment of Stratospheric Ozone: 1989", U.N. Environment Programme (21 Aug. 1989).

EXAMPLES 1–4

These examples illustrate the thermal performance of polyurethane foams prepared using blends of HFC-152a and DME as the blowing agent composition. Comparative Sample A illustrates a control foam prepared with the current commercial blowing agent, CFC-11.

Starting materials and foam properties are presented in Table I below.

TABLE I

| Example | A* | | 1 | 2 | 3 | 4 |
|---|---|---|---|---|---|---|
| Blowing Agent (BA) | CFC-11 | HFC-152a (%) | 90 | 90 | 95 | 80 |
| | | DME (%) | 10 | 10 | 5 | 20 |
| Polyol¹ (g) | 100 | | 100 | 100 | 100 | 100 |
| Isocyanate² (g) | 158 | | 158 | 158 | 158 | 158 |
| Isocyanate Index | 250 ± 50 | | 250 ± 50 | 250 ± 50 | 250 ± 50 | 250 ± 50 |
| BA (weight %) | 13.6 | | 4.9 | 8.6 | 5.2 | 6.2 |
| Molded foam density (lb/ft³) | 2.5 | | 2.0 | 2.3 | 1.8 | 2.3 |
| K-factor (BTU-in/hr-ft²-°F.) | 0.14 | | 0.17 | 0.18 | 0.19 | 0.17 |

*Comparative Example (not of this invention).
¹Polyol as included in a fully formulated system comprising an aromatic polyester polyol with an equivalent weight of 224, catalyst and surfactant.
²Polymeric methylene diisocyanate with an equivalent weight of 136.5.

It was noted that the K-factor using blends of HFC-152a and DME as the blowing agent composition approximated that obtained using the current commercial blowing agent composition CFC-11; and these results were obtained using much smaller quantities of the HFC-152a/DME blends.

EXAMPLES 5–6

These examples illustrate the thermal performance of polyurethane foams using blowing agent compositions containing water in addition to blends of HFC-152a and DME.

Comparative Samples B, C and D involve control foams prepared using CFC-11 and water as the blowing agent compositions.

The materials used and the foam properties obtained are presented in Table II.

TABLE II*

| Example | B** | C** | D** | 5 | 6 |
|---|---|---|---|---|---|
| Blowing Agent (BA) | | CFC-11 | | HFC/DME | |
| weight % | 100 | 100 | 100 | 90/10 | 30/70 |
| grams | 12 | 22 | 32.6 | 11.5/1.3 | 3.2/7.4 |
| Polyol¹ (g) | 100 | 100 | 100 | 100 | 100 |
| Isocyanate² (g) | 270 | 270 | 270 | 270 | 270 |
| Isocyanate Index | 250 ± 50 | 250 ± 50 | 250 ± 50 | 250 ± 50 | 250 ± 50 |
| BA (weight %)³ | 3.1 | 5.5 | 8.0 | 3.3 | 2.7 |

TABLE II*-continued

| Example | B** | C** | D** | 5 | 6 |
|---|---|---|---|---|---|
| Molded foam density (lb/ft$^3$) | 3.4 | 3.2 | 3.3 | — | — |
| K-factor (BTU-in/hr-ft$^2$-°F.) | .17 | .16 | .15 | .18 | .18 |

*2.5 g of water were used per 100 g polyol in all examples.
**Comparative Examples (not of this invention).
$^1$Polyol as included in a fully formulated system comprising an aromatic polyester polyol with an equivalent weight of 224, catalyst and surfactant.
$^2$Polymeric methylene diisocyanate with an equivalent weight of 136.5.
$^3$Does not include the CO$_2$ from the water used.

It was noted that the K-factor using blends of HFC-152a and DME and water as the blowing agent composition approximated that obtained using the current commercial blowing agent composition CFC-11 when used with water.

We claim:

1. In a process for producing a closed-cell rigid polyurethane or polyisocyanurate polymer foam wherein an isocyanate-containing compound is mixed and allowed to react with an active hydrogen-containing compound in the presence of a blowing agent composition, the improvement wherein the blowing agent composition consists essentially of 2 to about 25 weight percent, based on the combined weight of the isocyanate and the active hydrogen-containing compound, of a mixture of 1,1-difluoroethane and dimethyl ether.

2. The process of claim 1 wherein the blowing agent composition contains 1,1-difluoroethane and 5-75 weight percent of dimethyl ether.

3. The process of claim 1 wherein the blowing agent composition contains 1,1-difluoroethane and 5-30 weight percent of dimethyl ether.

4. The process of claim 1 wherein the blowing agent composition also contains up to 50 mole percent of water.

5. The process of claim 1 wherein said polyisocyanurate has an isocyanate index of 0.9-10.

* * * * *